UNITED STATES PATENT OFFICE.

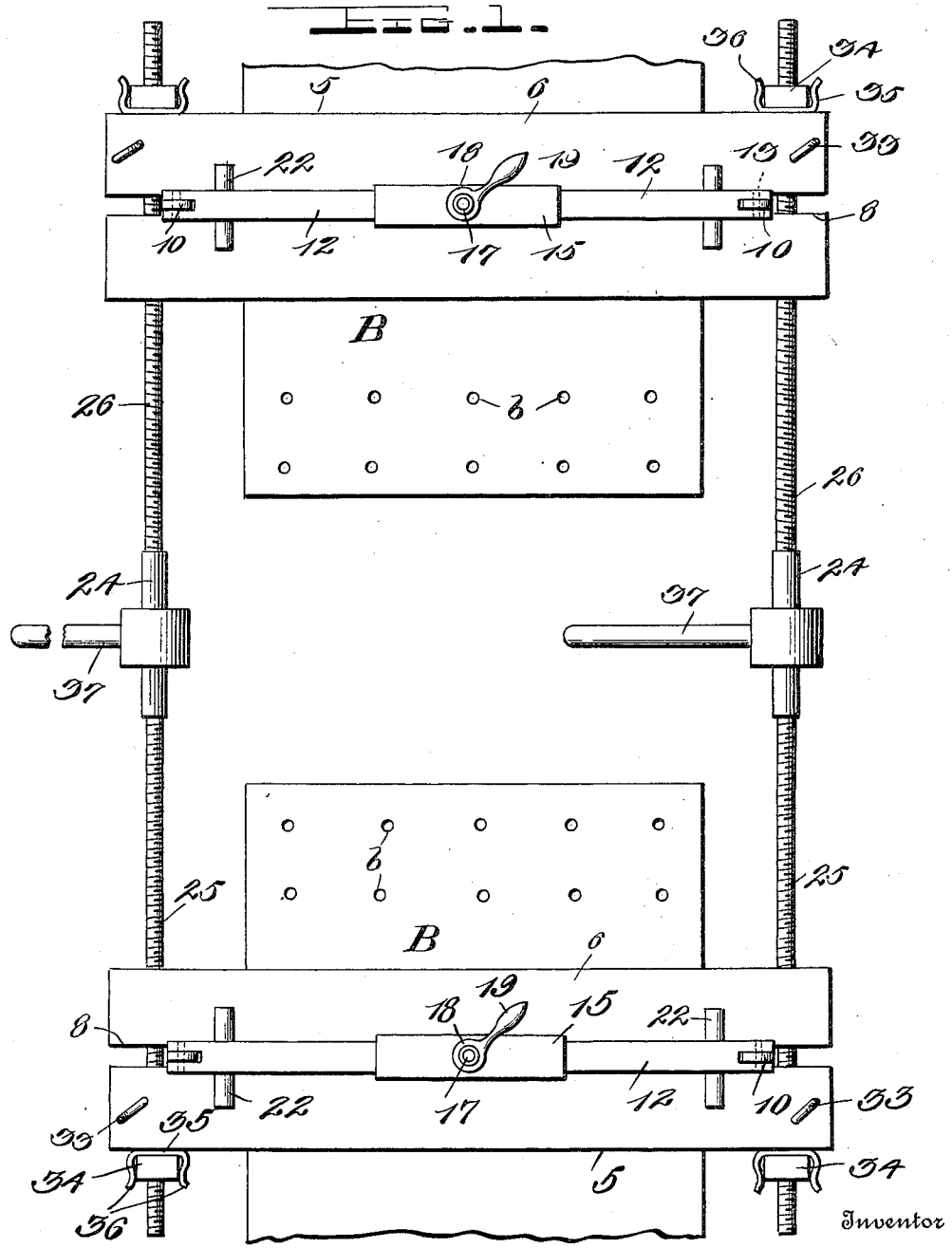

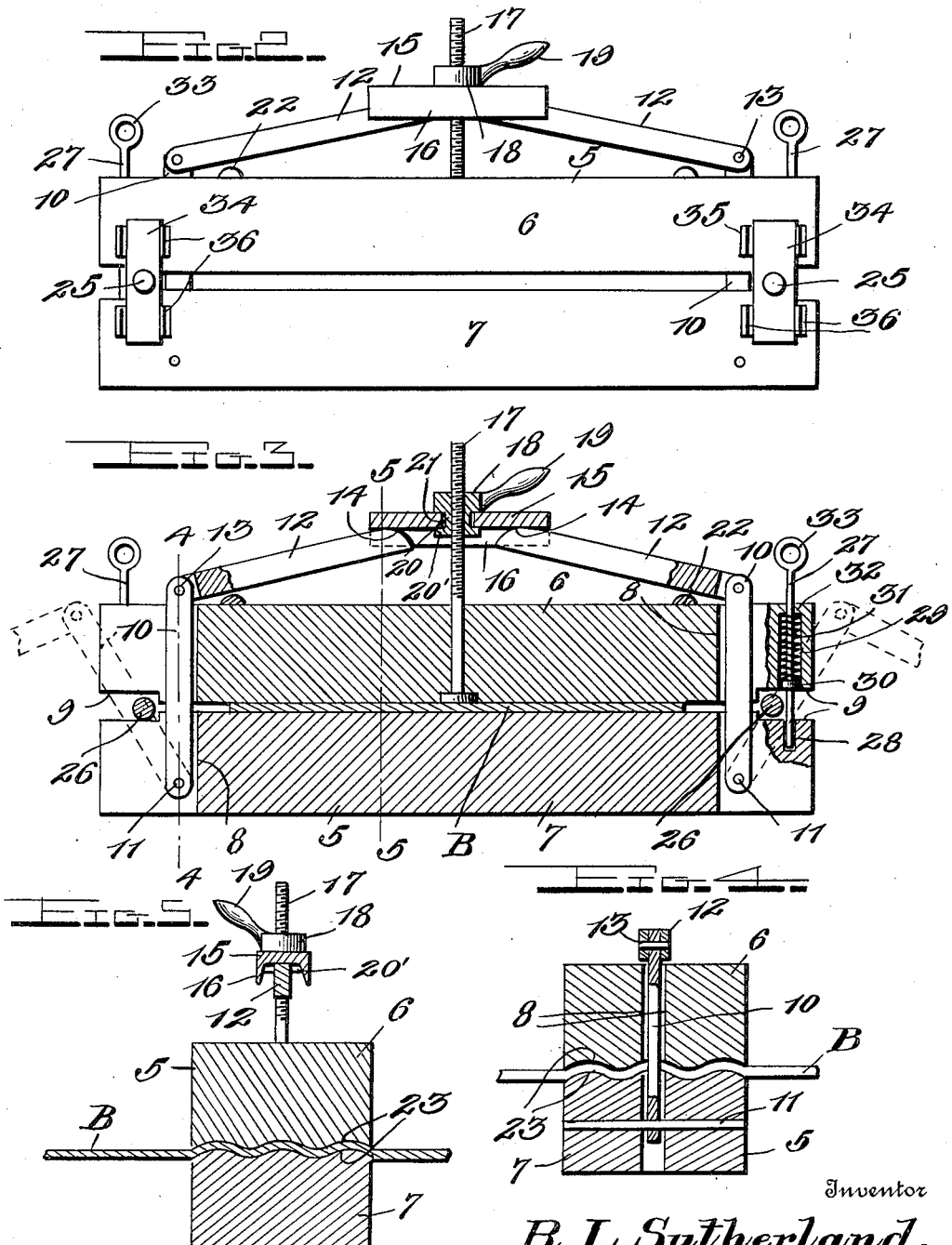

ROBERT L. SUTHERLAND, OF BOULDER, COLORADO.

BELT-STRETCHER.

1,036,369.  Specification of Letters Patent.  Patented Aug. 20, 1912.

Application filed January 8, 1912. Serial No. 670,058.

*To all whom it may concern:*

Be it known that I, ROBERT L. SUTHERLAND, a citizen of the United States, residing at Boulder, in the county of Boulder and State of Colorado, have invented certain new and useful Improvements in Belt-Stretchers, of which the following is a specification, reference being had to the accompanying drawings.

This invention relates to belt stretchers and more particularly to devices of that character which are employed for connecting the ends of a driving belt so that the same may be securely laced together.

The primary object of the present invention resides in the provision of a belt stretcher for the above purpose which may be easily and quickly arranged upon or removed from the ends of the belt, said device including manually operable means whereby the opposed ends of the belt may be drawn together.

Another object of the invention is to provide clamps of improved construction, and means whereby the same may be quickly arranged upon the ends of the belt to grip the same, and removable operating devices connecting the clamps on the respective ends of the belt to move the belt ends in opposite directions toward each other in position to receive a lacing or other suitable fastening means.

Still another object of the invention is to provide a belt stretcher of the above character which is comparatively simple and durable in construction and highly efficient in practical use.

With the above and other objects in view, the invention consists of the novel features of construction, combination and arrangement of parts hereinafter fully described and claimed, and illustrated in the accompanying drawings, in which—

Figure 1 is a plan view showing my improved stretcher arranged upon the opposed ends of a belt; Fig. 2 is a side elevation of one of the belt clamps; Fig. 3 is a longitudinal section of the clamp showing the same engaged upon the belt; Fig. 4 is a section taken on the line 4—4 of Fig. 3; and Fig. 5 is a section taken on the line 5—5 of Fig. 3.

Referring in detail to the drawings B designates a belt, the ends of which are provided with the lacing eyelets *b*.

My improved stretching device includes the clamps 5 which are adapted to be arranged upon the ends of the belt inwardly of the lacing eyelets *b*. Each of these clamps includes upper and lower clamping bars 6 and 7 respectively. These bars are of similar form and it will be understood that they may be of any desired length so as to project beyond the opposite edges of the belt as shown in Fig. 1. The ends of each of the clamping bars are provided with the short longitudinal slots 8 and the opposed faces of the upper and lower bars are recessed at their ends as indicated at 9. The purpose of these recesses will more fully appear from the following description.

In the inner ends of the slots 8 in the lower clamping bar 7, one end of the links 10 are pivoted as indicated at 11. The other ends of these link bars extend above the upper face of the clamping bar 6 and to the same the outer ends of the arms 12 are pivoted as shown at 13. The inner ends of these arms are provided with the curved or convex edges 14 to bear against the base of a channel 16 provided in the movable bar 15. A vertically disposed rod 17 is rigidly fixed in the upper clamping bar 6 and is threaded to receive a nut 18 on which a handle 19 is formed. The nut 18 is provided with a reduced cylindrical portion 20 which is loosely disposed in an opening 21 centrally provided in the bar 15, said reduced portion of the nut having a flange 20′ formed thereon to retain the same in said opening. Upon the upper surface of the clamping bar 6, the short ribs 22 are formed or secured adjacent to its ends, said ribs serving as fulcrums for the arms 12.

By means of the foregoing construction it will be readily seen that when the nut 18 is turned upon the threaded rod 17 and moved downwardly thereon, the bar 15 bearing upon the inner ends of the arms 12 will force the same downwardly and move the outer ends of the arms upwardly, said arms rocking upon the ribs 22. This upward movement of the outer ends of the arms draws the link bars 10 through the recesses in the ends of the upper clamping bar 8, and moves the opposed faces of the bars into gripping engagement upon the top and bottom faces of the belt. The opposed faces of the clamping bars 6 and 7 are longitudinally grooved or corrugated as indicated at 23 so that they will effectually grip the belt and prevent the same from slipping between the clamping bars. After the clamps have been arranged upon the opposed ends of the belt in the manner above described, the operating means is connected to the projecting end portions of the clamping bars whereby the clamps are drawn toward each other, thus stretching the belt. This operating means is constructed and mounted in the ends of the bars in the following manner.

The longitudinally extending rods 24 are provided upon opposite sides of their central portions with the right and left hand screw threads 25 and 26 respectively. These threaded portions of the rods are disposed in the recesses 9 formed in the opposed faces of the clamping bars at their ends and in order to retain said rods in position, I provide a spring pressed bolt 27. One end of this bolt engages in a circular recess or socket 28 provided in the end of the lower clamping bar 7, said rod extending through a vertical opening 29 in the end of the upper clamping bar. A shoulder 30 is formed upon said rod and with said shoulder one end of a coiled spring 31 engages, the other end of said spring bearing against an annular shoulder 32 provided in the upper end of the opening 29. This spring normally acts to force the locking bolt 27 downwardly and into the socket 28 of the lower clamping bar, in which position of the bolt the threaded rod 24 is disposed between the same and the link bars 10 which are arranged in the inner ends of the slots 8 of the clamping bars. The upper ends of the bolts 27 are provided with eyes or finger loops 33 by means of which they may be readily lifted against the tension of the springs 31 so that the threaded rods 24 can be moved out of the slots 8 of the clamping bars. Upon the ends of the operating rods 24, the blocks 34 are threaded, and these blocks are held against turning movement by means of the holding members 35 which are fixed upon the ends of each of the clamping bars and on one of the side faces thereof. It will be observed from reference to Fig. 2 that the blocks 34 are of elongated rectangular form and are vertically disposed with relation to the clamping bars, the ends of said blocks engaging between the spring arms 36 of the holding members 35. These arms clamp upon the opposite sides of the blocks and effectually hold the same against turning movement when the operating rod 24 is rotated. Upon the central portions of the rods 24 suitable operating handles 37 are fixed whereby the rods may be rotated.

From the foregoing it will be readily seen that after the clamps 5 have been properly arranged upon the separated ends of the belt and the operating rods 24 mounted between the ends of the clamping bars in the manner above described, the belt ends may be drawn toward each other by moving the operating handle 37 to rotate the rod 24 in the proper direction, the oppositely threaded portions of which move through the blocks 34 in which the same are threaded so that the clamps are drawn toward each other until the end edges of the belt are engaged. While the belt is thus held in a stretched condition, the ends thereof are connected by passing the lacing through the eyelets *b* in the usual manner. The device may then be easily and quickly removed from the belt by simply reversing the rotation of the operating rods 24 and rotating the nut 18 on the threaded rod 17 so that the link bars 10 and arms 12 may be swung outwardly to the positions shown in dotted lines in Fig. 3. It is of course, understood that the operating rods 24 are first removed from the ends of the clamps by elevating or locking the bolts 27. The bars 6 and 7 of the clamps may then be removed from the belt.

From the above it is thought that the construction and operation of my improved belt stretcher will be fully understood.

The device is simple, may be easily and quickly applied and is extremely strong and durable in practical use. The ends of the belt may be quickly connected with but little labor upon the part of the operator.

The blocks 6 and 7 of the clamps may be constructed of wood, metal or any other desired material and if desired the corrugated surfaces 23 thereof may be faced with rubber or other friction material to increase the gripping action of the bars upon the belt. It will also be understood that the invention is susceptible of a great many other modifications in the form, proportion and arrangement of the parts without departing from the essential feature or sacrificing any of the advantages thereof.

Having thus described the invention what is claimed is:—

1. In a belt stretcher, clamps to be arranged upon the opposed ends of the belt, each of said clamps including upper and lower clamping bars, pivoted links mounted in the ends of the lower bar, a movable member mounted upon the upper bar, means connected to said links and engaged by said movable member to force the clamping bars in opposite directions and into gripping engagement with the belt, and operating means connecting the corresponding ends of the clamps on the opposite ends of the belt to move the same in opposite directions and draw the ends of the belt together.

2. In a belt stretcher, clamps to be arranged upon opposite ends of the belt, each of said clamps consisting of upper and lower clamping bars, links pivotally mounted in the ends of the lower clamping bar, a vertically movable member centrally mounted upon the upper clamping bar, means for moving said member, arms pivotally connected at their outer ends to said links, said movable member engaging the inner ends of said arms, ribs on the upper face of the latter clamping bar to be engaged by said arms and serve as fulcrums therefor, and operating means removably arranged in the corresponding ends of the respective clamps to move the same in opposite directions and draw the ends of the belt together.

3. In a belt stretcher, clamps to be arranged upon the opposed ends of a belt, each of said clamps consisting of upper and lower clamping bars having longitudinal slots in each of their ends, links pivoted in the inner ends of the slots in the lower bars, clamping means mounted upon the upper bars, said links being disposed through the slots in the ends of the upper bar, means connected to said links and engaged by said clamping means to cause the bars to grip upon the opposite faces of the belt, and operating means comprising longitudinally extending rods having their ends provided with right and left hand screw threads respectively, said threaded ends of the rods being disposed between the ends of the clamping bars on opposite ends of the belt, blocks threaded upon the ends of said rods to engage with the clamping bars, means for removably retaining said rods in position between the clamping bars, and means for rotating said rods to move the clamps in opposite directions and draw the belt ends together.

In testimony whereof I hereunto affix my signature in the presence of two witnesses.

ROBERT L. SUTHERLAND.

Witnesses:
  ELLEN BENSON,
  ADAM WEBER.

---

Copies of this patent may be obtained for five cents each, by addressing the "Commissioner of Patents, Washington, D. C."